(12) United States Patent
Sesumi

(10) Patent No.: US 6,715,017 B2
(45) Date of Patent: Mar. 30, 2004

(54) INTERRUPTION SIGNAL GENERATING APPARATUS

(75) Inventor: Kazunari Sesumi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 612 days.

(21) Appl. No.: 09/764,085

(22) Filed: Jan. 19, 2001

(65) Prior Publication Data

US 2002/0004869 A1 Jan. 10, 2002

(30) Foreign Application Priority Data

Jul. 10, 2000 (JP) ........................................ 2000-207817

(51) Int. Cl.[7] .............................. G06F 13/24; G06F 1/12; G06F 1/32
(52) U.S. Cl. ........................ 710/260; 713/320; 713/400; 713/502
(58) Field of Search ................................ 713/320, 322, 713/400, 500, 501, 502, 600, 601; 710/260, 262

(56) References Cited

U.S. PATENT DOCUMENTS 4,090,239 A * 5/1978 Twibell et al. .............. 713/502
5,875,342 A * 2/1999 Temple ....................... 710/260
5,937,199 A * 8/1999 Temple ....................... 710/262
6,504,876 B1 * 1/2003 Suto ........................... 375/259

* cited by examiner

Primary Examiner—Thomas M. Heckler
(74) Attorney, Agent, or Firm—Rabin & Berdo, P.C.

(57) ABSTRACT

An interruption signal generating apparatus comprises a counter unit counting a predetermined time interval and outputting a count-up signal indicating the end of the counting; a first generating unit detecting the end of the counting indicated by the count-up signal and generating a first interruption signal indicating the detection according to a first clock; a second generating unit detecting the end of the counting indicated by the count-up signal and generating a second interruption signal indicating the detection according to a second clock; and a selecting unit selectively outputting the first and second interruption signals. Even in the stop mode in which a bus clock for making the computer system operative is unprovided, the interruption signal can be generated in a manner similar to the normal mode in which the bus clock is provided.

8 Claims, 6 Drawing Sheets

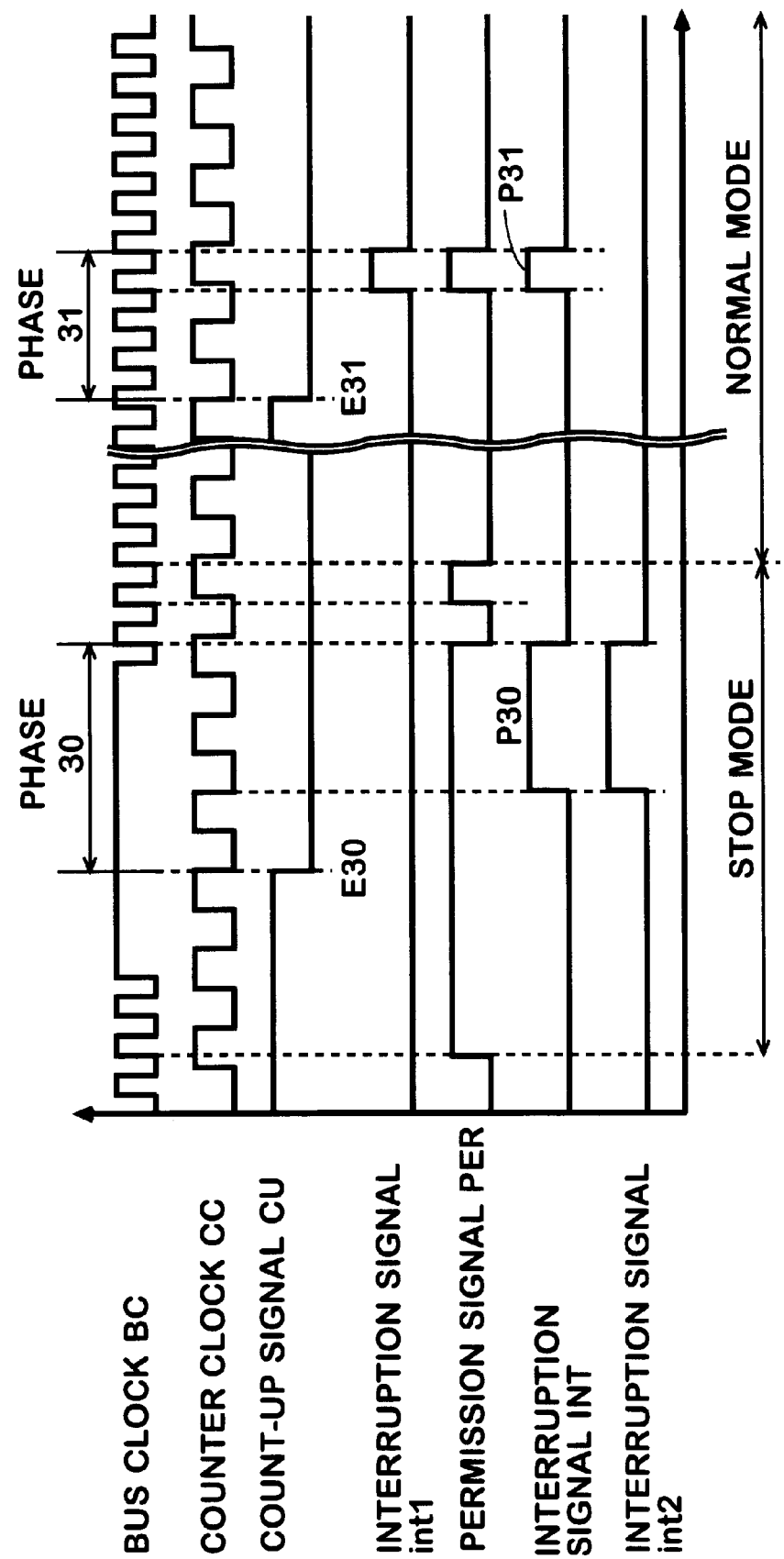

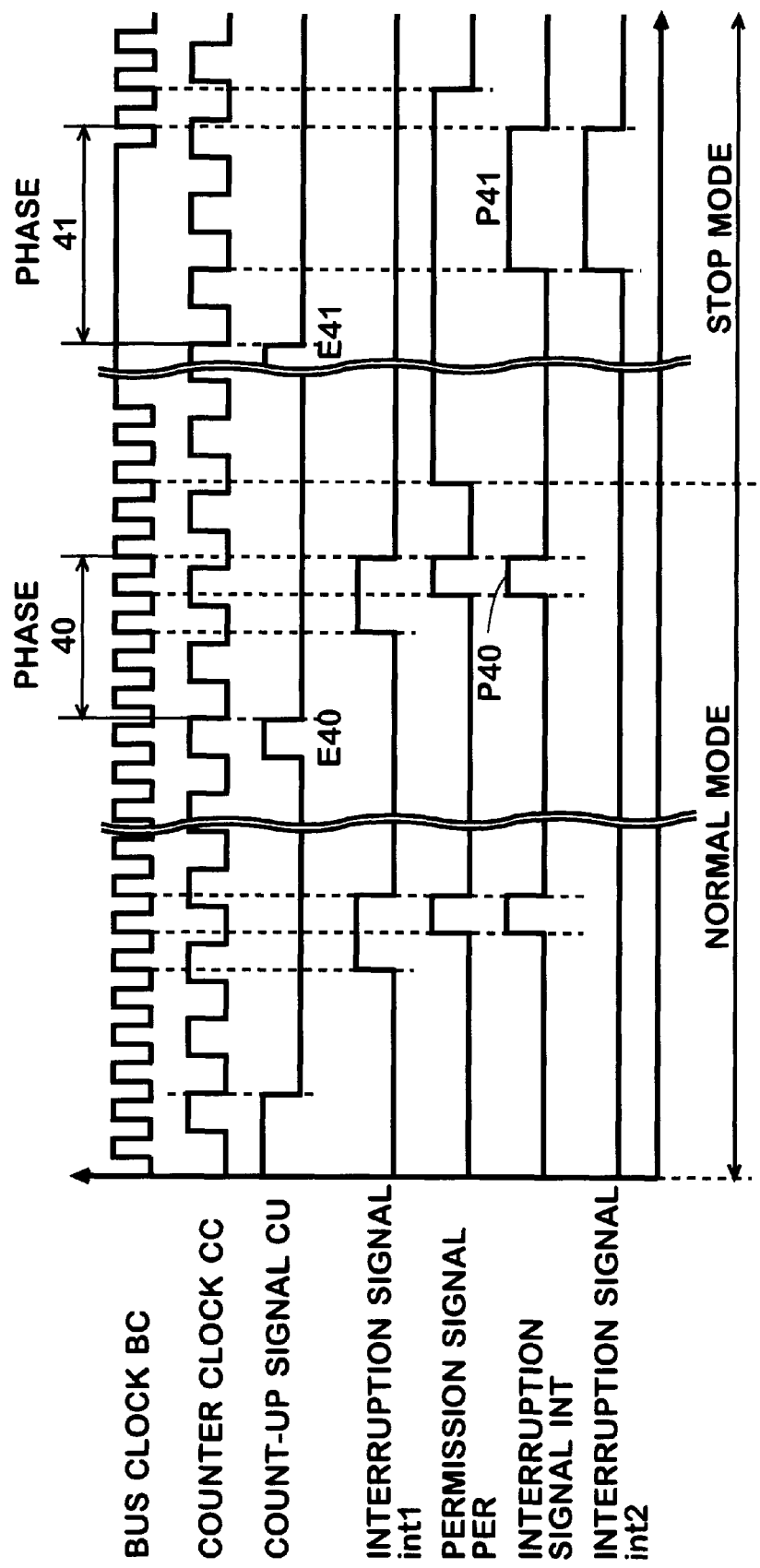

INTERRUPTION SIGNAL GENERATING APPARATUS

BACKGROUND OF THE INVENTION

1. Field of the Invention

The invention relates to an interruption signal generating apparatus for generating an interruption signal which is used in a computer system.

2. Related Art

A computer system has an interruption signal generating apparatus for generating a signal (hereinafter, referred to as an "interruption signal") for requesting an interrupting process to a CPU (Central Processing Unit) for allowing the CPU to execute a predetermined interrupting process every predetermined time that is, periodically. The computer system switches an operation mode, for instance, between a normal mode and a stop mode in order to reduce an electric power consumption.

In the normal mode, a clock (hereinafter, referred to as a "bus clock") for synchronously performing a process to be executed in the whole computer system is generated in the computer system and the bus clock is supplied to each operating section of the system. Therefore, in the normal mode, the conventional interruption signal generating apparatus generates the interruption signal synchronously with the bus clock.

In the stop mode, however, since there is no process to be executed, the supply of the bus clock is stopped. Therefore, in the stop mode, the conventional interruption signal generating apparatus cannot generate the interruption signal. That is, the conventional interruption signal generating apparatus has a problem such that it cannot generate the interruption signal irrespective of the operation mode.

SUMMARY OF THE INVENTION

The invention is made to solve the above problem and it is an object of the invention to provide an interruption signal generating apparatus which can generate an interruption signal irrespective of an operation mode.

To accomplish the above object, according to a first aspect of the invention, there is provided an interruption signal generating apparatus used for a computer system that receives a first clock and a second clock from the computer system and outputs an interruption signal for requesting an execution of an interrupting process at a time interval corresponding to a frequency obtained by dividing in frequency the second clock, wherein the first clock is provided according to an operation mode of the computer system, and the second clock has a period longer than that of the first clock, is used to generate the interruption signal, and is provided irrespective of the operation mode of the computer system, the interruption signal generating apparatus comprising: a counter unit that counts the time interval based upon the second clock and outputs a count-up signal indicating an end of the counting; a first generating unit that detects the end of the counting indicated by the count-up signal while the first clock is being provided and generates a first interruption signal indicating the detection according to the first clock; a second generating unit that detects the end of the counting indicated by the count-up signal while the first clock is not being provided and generates a second interruption signal indicating the detection according to the second clock; and a selecting unit that selectively outputs the first interruption signal and the second interruption signal according to the operation mode of the computer system.

It is desirable that the first clock is a bus clock signal for synchronizing the operation of the computer system as a whole.

It is desirable that the count-up signal indicates the end of the counting by a change in edge of the count-up signal, the first generating unit has a first differentiating circuit that detects the edge, and the second generating unit has a second differentiating circuit that detects the edge. It is further desirable that the first and second generating units are supplied with a permission signal for permitting an output of the first and second interruption signals by the computer system, the first generating unit further has a first holding circuit that holds a first detection signal indicative of the detection of the edge in response to the detection of the edge by the first differentiating circuit, the second generating unit further has a second holding circuit that holds a second detection signal indicative of the detection of the edge in response to the detection of the edge by the second differentiating circuit, the first generating unit generates the first interruption signal in accordance with the first clock, the first detection signal, and the permission signal, and the second generating unit generates the second interruption signal in accordance with the second clock, the second detection signal, and the permission signal.

It is desirable that the computer system restarts the supply of the first clock to the first generating unit of the interruption signal generating apparatus in response to the second interruption signal which is outputted from the selecting unit, and the second generating unit has a reset circuit that resets the second interruption signal in response to the restart of the supply of the first clock.

It is desirable that said signal selected by said selecting unit is outputted at substantially the same time with said output of said count-up signal indicative of said end of said counting of said time interval. It is more desirable that a time interval between adjacent ones of a plurality of first interruption signals during a provision of the first clock, a time interval between adjacent ones of a plurality of second interruption signals during an unprovision of the first clock, a time interval between last one of a plurality of first interruption signals during a provision of the first clock and first one of the plurality of second interruption signals during an unprovision of the first clock following the provision of the first clock, and a time interval between last one of a plurality of second interruption signals during a unprovision of the first clock and a first one of a plurality of first interruption signals during a provision of the first clock following the unprovision of the first clock are substantially identical with each other.

According to a second aspect of the present invention, there is provided a computer system comprising: an interruption signal generating apparatus specified according to the first aspect of the present invention; a central processing unit that stops the supply of the first clock in accordance with a predetermined program while the first clock is being supplied; and a system controller that starts the supply of the first clock in response to the interruption signal from the interruption signal generating apparatus while the first clock is being unprovided.

The above and other objects and features of the present invention will become apparent from the following detailed description and the appended claims with reference to the accompanying drawings.

BRIEF DESCRIPTION OF THE DRAWINGS

FIG. 5 is a time chart showing the shifting operation from the stop mode to the normal mode; and FIG. 6 is a time chart showing the shifting operation from the normal mode to the stop mode.

DETAILED DESCRIPTION OF THE PREFERRED EMBODIMENT

An embodiment of an interruption signal generating apparatus will now be described.

Figure 1:
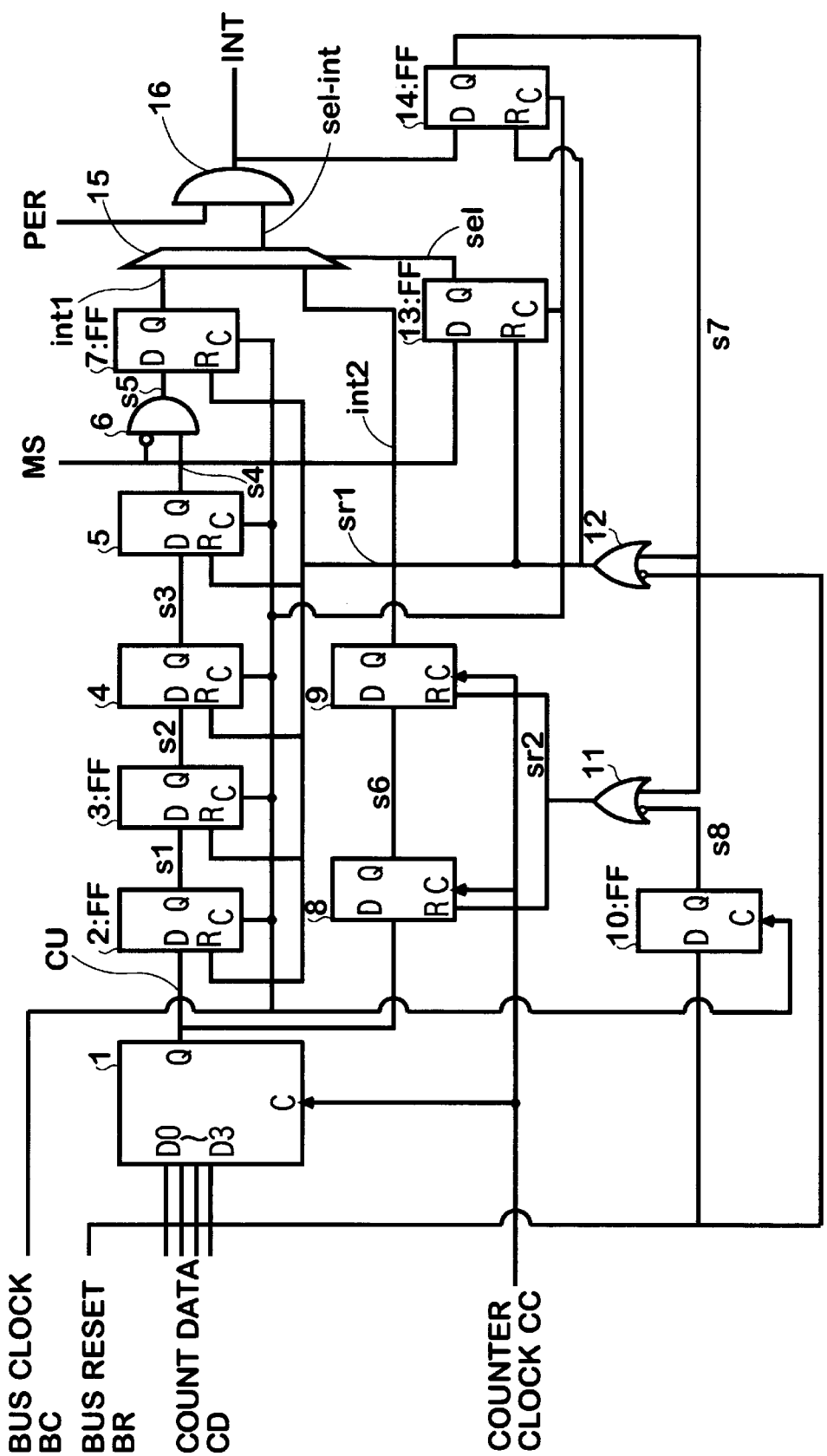
FIG. 1 is a diagram showing a construction of an embodiment of an interruption signal generating apparatus.

FIG. 1 is a diagram showing a construction of an interruption signal generating apparatus. To make an explanation and understanding of the interruption signal generating apparatus easy, prior to explaining, a computer system including such an apparatus will be described.

Figure 2:
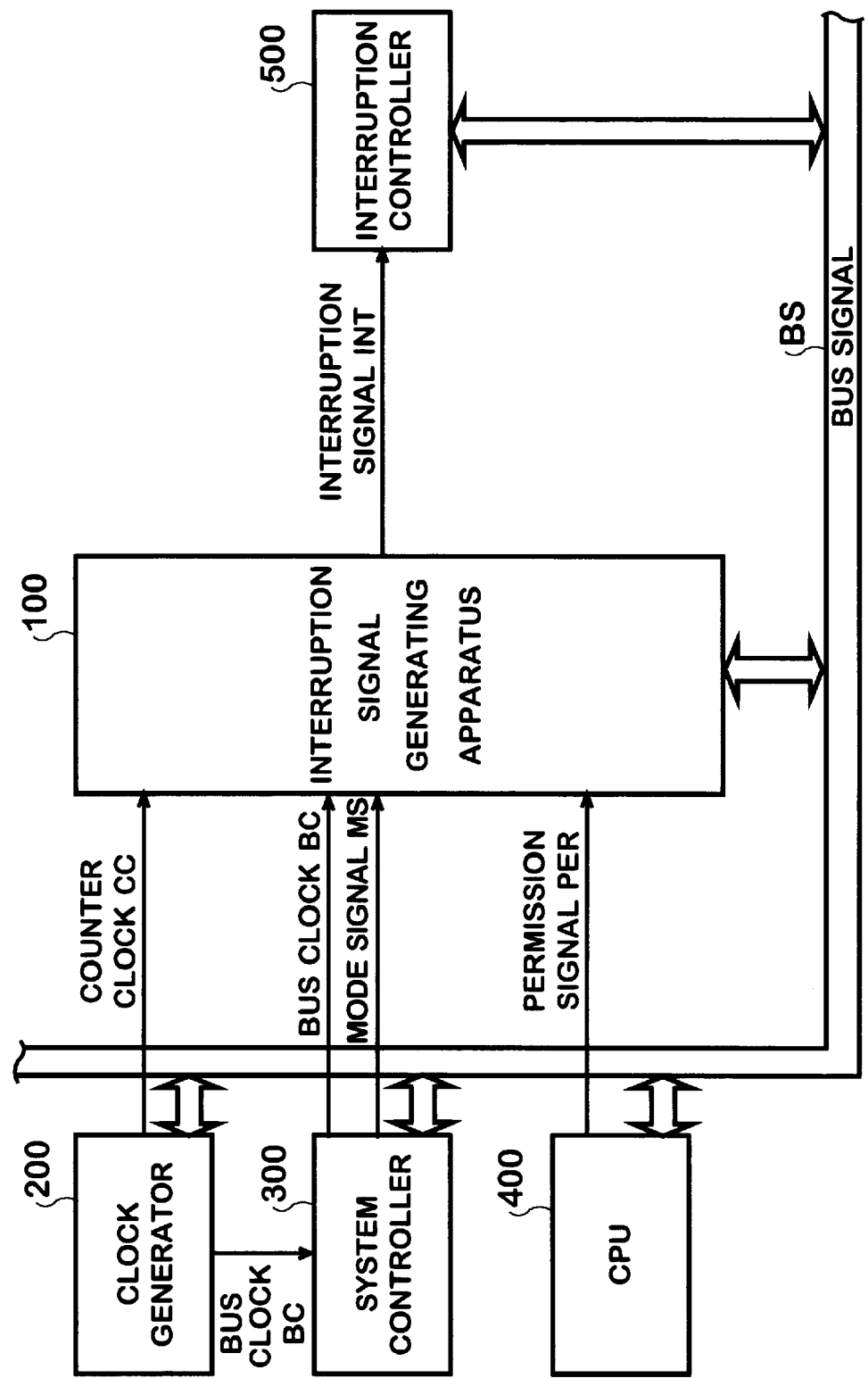
FIG. 2 is a diagram showing a construction of an embodiment of a computer system.

FIG. 2 is a diagram showing a construction of the computer system. The computer system has a normal mode and a stop mode as operation modes. The computer system executes processes in a normal manner in accordance with a program in the normal mode. In the stop mode, the computer system does not operate in principle for the purpose of reduction of an electric power consumption.

In the normal mode, both of a counter clock CC for counting time and a bus clock BC which is used for synchronizing the whole system and has a frequency higher than that of the counter clock CC are supplied from a clock generator, which will be explained hereinlater, to the interruption signal generating apparatus. In the stop mode, only the counter clock CC is supplied and the bus clock BC is not supplied.

While such modes and clocks are used as a base of the operation, in the normal mode, an interruption signal generating apparatus 100 generates an interruption signal INT synchronously with the bus clock BC on the basis of the counter clock CC. In the stop mode, the interruption signal generating apparatus 100 generates the interruption signal INT on the basis of only the counter clock CC.

In addition to the interruption signal generating apparatus 100, the computer system has a clock generator 200, a system controller 300, a CPU 400, and an interruption controller 500. The interruption signal generating apparatus 100 uses, in common, a bus signal BS (signal comprising a data signal, an address signal, a read/write signal, and the like) and the bus clock BC as a foregoing first clock for synchronously using the bus signal BS in the whole system together with those peripheral apparatuses 200 to 500. Under the control of a mode signal MS and a permission signal PER, the interruption signal generating apparatus 100 outputs the interruption signal INT generated in accordance with the counter clock CC as a second clock and the first clock, that is, the bus clock BC to the interruption controller 500.

The peripheral apparatuses 200 to 500 of the interruption signal generating apparatus 100 have the following functions. The clock generator 200 constantly generates the counter clock CC and bus clock BC. The clock generator 200 supplies the generated counter clock CC to the interruption signal generating apparatus 100 and outputs the generated bus clock BC to the system controller 300.

Under the control by the CPU 400, the system controller 300 supplies the inputted bus clock BC to the interruption signal generating apparatus 100 or stops the supply of the bus clock BC.

The CPU 400 switches the operation mode of the computer system from the normal mode to the stop mode in accordance with a prepared program (not shown).

When the interruption signal INT is supplied in the stop mode, the interruption controller 500 shifts the operation mode from the stop mode to the normal mode. Specifically, the interruption controller 500 requests the system controller 300 to restart supplying the bus clock BC whose supply was stopped in the stop mode. In response to this request, the system controller 300 restarts the supply of the bus clock BC. When the supply of the bus clock BC is restarted, the CPU 400 executes a predetermined process corresponding to the interruption signal INT synchronously with the bus clock BC.

Returning to FIG. 1, the interruption signal generating apparatus 100 is principally supplied with the counter clock CC, bus clock BC, mode signal MS, and permission signal PER as mentioned above, and the apparatus 100 generates the interruption signal INT on the basis of those signals. To generate the interruption signal INT, the interruption signal generating apparatus 100 has a counter circuit 1; differentiating circuits 4 and 8; holding circuits 5 and 9; a selector circuit 15; AND circuits 6 and 16; OR circuits 11 and 12; and RS flip-flop circuits (hereinafter, abbreviated as "F/F circuits") 2, 3, 7, 10, 13, and 14.

To periodically output the interruption signal INT, the counter circuit 1 counts a period of outputting the interruption signal INT, that is, a time interval for outputting the interruption signal INT by dividing the counter clock CC in frequency. Each time such a period is counted up, that is, each time the time interval elapses, the counter circuit 1 outputs a count-up signal CU indicative of such a fact by a trailing edge. The trailing edge is periodically outputted in this manner. This period has been preset by the CPU 400 by using count data D0 to D3.

The differentiating circuit 4 detects an edge of the count-up signal CU in order to recognize the count-up shown by the count-up signal CU. The holding circuit 5 starts the output of a high level signal as a signal s3 in response to the detection of the edge by the differentiating circuit 4 as a trigger and continuously maintains the high level of the signal s3 until a signal sr1 at the high level is supplied.

The selector circuit 15 selects an interruption signal int1 or int2 in response to a selection signal sel. Specifically, the selector circuit 15 selects the interruption signal int1 in the normal mode, that is, when the selection signal sel is at the low level and selects the interruption signal int2 in the stop mode, that is, when the selection signal sel is at the high level. In this manner, as a selection interruption signal sel_int, the interruption signal int1 is outputted in the normal mode and the interruption signal int2 is outputted in the stop mode.

Each of the AND circuits 6 and 16 calculates the AND operation of the two input signals. Each of the OR circuits 11 and 12 calculates the OR operation of the two input signals. Each of the F/F circuits 2, 3, 7, 10, 13, and 14 outputs the input signal synchronously with the bus clock BC and resets its output signal in response to a bus reset signal BR which is inputted to a reset terminal R.

The bus reset signal BR is supplied as a high level signal only at the time of the initial operation, reset, or the like of the computer system and resets the interruption signal generating apparatus 100.

The operation of the interruption signal generating apparatus 100 will now be described. As an operation, the normal mode, the stop mode, the transition from the stop mode to the normal mode, and the transition from the normal mode to the stop mode will be described.

Figure 3:
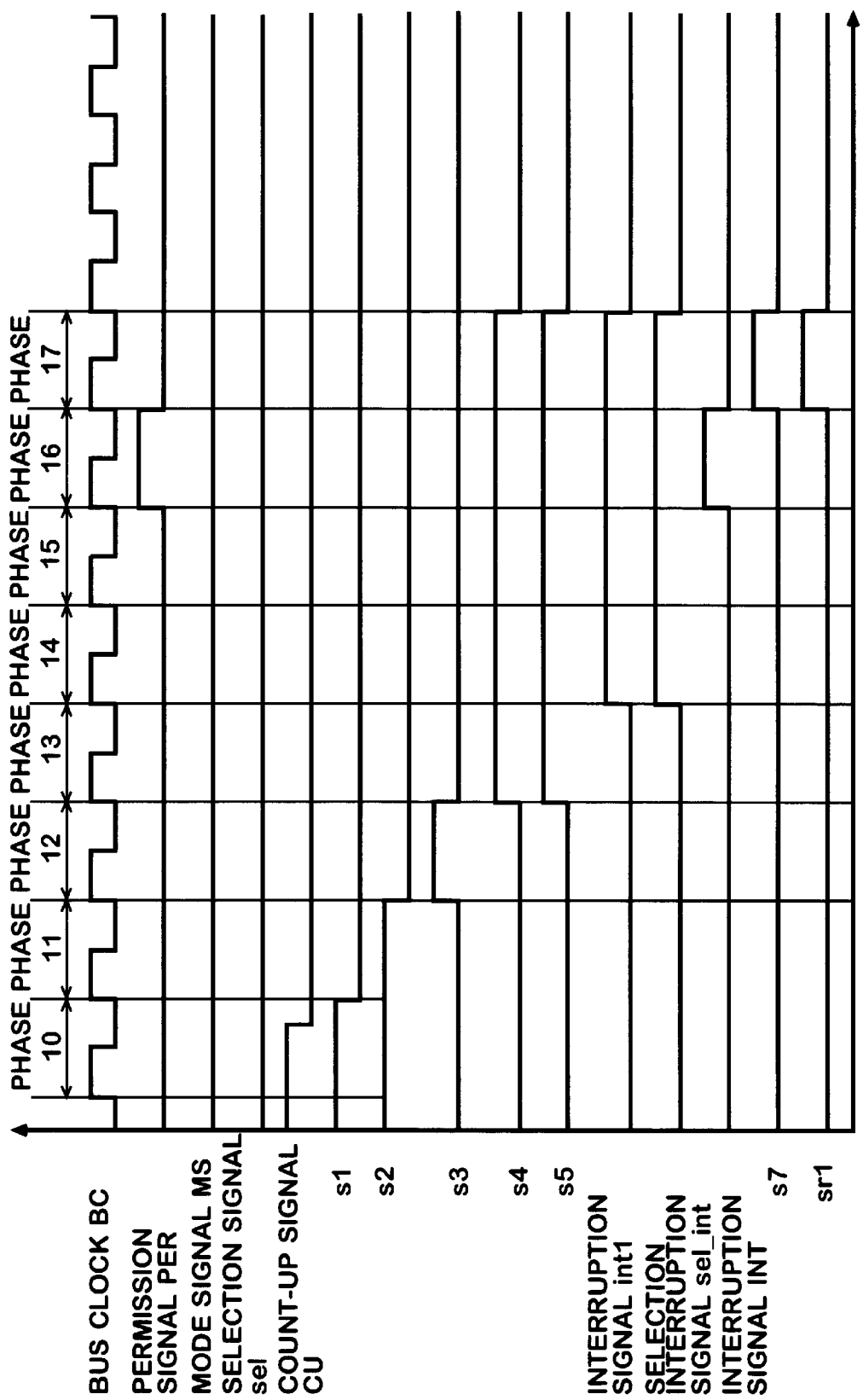
FIG. 3 is a time chart showing the operation in a normal mode of the interruption signal generating apparatus.

FIG. 3 is a time chart showing the operation in the normal mode of the interruption signal generating apparatus. The operation will now be described hereinbelow with reference to the time chart.

In the normal mode, the mode signal MS is at the low level. Thus, a signal s4 which is inputted to the AND circuit 6 is directly outputted as a signal s5. Since the selection signal sel which is outputted from the F/F circuit 13 is also at the low level because the mode signal MS is at the low level, the interruption signal int1 which is formed from the signal s5 is outputted as an interruption signal INT from the selector circuit 15.

Phase 10:

The counter circuit 1 divides in frequency the counter clock CC to count up a predetermined time, thereby outputting the count-up signal CU indicative of a fact that it has been counted up. More specifically, the counter circuit 1 shows the fact that the count-up has been performed by the trailing edge of the count-up signal. Since the counter clock CC and bus clock BC are asynchronous, the trailing edge of the count-up signal CU is outputted asynchronously with the bus clock BC.

Phase 11:

Upon receipt of the low level signal after the trailing of the count-up signal CU, the F/F circuit 2 outputs a low level signal as a signal s1 synchronously with the bus clock BC.

Phase 12:

Upon receipt of the low level signal as the signal s1 from the F/F circuit 2, the F/F circuit 3 outputs a low level signal as a signal s2 synchronously with the bus clock BC. Further, when a trailing edge which changes from the high level to the low level is supplied as the signal s2, the differentiating circuit 4 detects the trailing edge and outputs a pulse corresponding to one cycle of the bus clock BC as a signal s3 showing a fact that the trailing edge of the signal s2 was detected.

Phase 13:

Upon receipt of the above pulse as the signal s3, the holding circuit 5 outputs a high level signal as a signal s4. When the signal s4 is supplied from the holding circuit 5, the AND circuit 6 directly outputs the signal s4 as a signal s5 in accordance with the above conditions.

Phase 14:

Upon receipt of the signal s5, the F/F circuit 7 outputs a high level signal as an interruption signal int1 synchronously with the bus clock BC. Further, the selector circuit 15 directly outputs the interruption signal int1 as a selection interruption signal sel_int in accordance with the above conditions of the normal mode.

Phase 16:

After receipt of the interruption signal int1, the AND circuit 16 outputs the high level interruption signal INT in response to the high level permission signal PER as a trigger which is supplied synchronously with the bus clock BC. In this manner, the high level of the interruption signal INT is supplied from the interruption signal generating apparatus 100 to the interruption controller 500.

Phase 17:

Upon receipt of the high level of the interruption signal INT, the F/F circuit 14 outputs a high level signal as a signal s7 synchronously with the bus clock BC. When the high level signal is supplied as the signal s7, the OR circuit 12 outputs a high level signal as a signal sr1 in response to the high level signal of the signal s7. In response to the high level of the signal sr1, the F/F circuits 2, 3, 7, and 14, differentiating circuit 4, and holding circuit 5 are reset. That is, the interruption signal INT is returned to the low level.

As mentioned prior to the description of the operation, the frequency of the bus clock BC is higher than that of the counter clock CC, and the count-up signal CU is obtained by dividing the counter clock CC in frequency. Therefore, the frequency of the bus clock BC is much higher than that of the count-up signal CU. Thus, from the viewpoint of the frequency of count-up signal CU, it can be regarded that the pulse (shown at phase 16) of an interruption signal INT is generated almost simultaneously with the trailing edge (shown at phase 10) of the count-up signal CU. In conclusion, in the normal mode, the period of time at which the pulse of the interruption signal INT shown at phase 16 arises can be regarded as similar to the period of time at which the trailing edge of the count-up signal CU shown at phase 10 arises.

Figure 4:
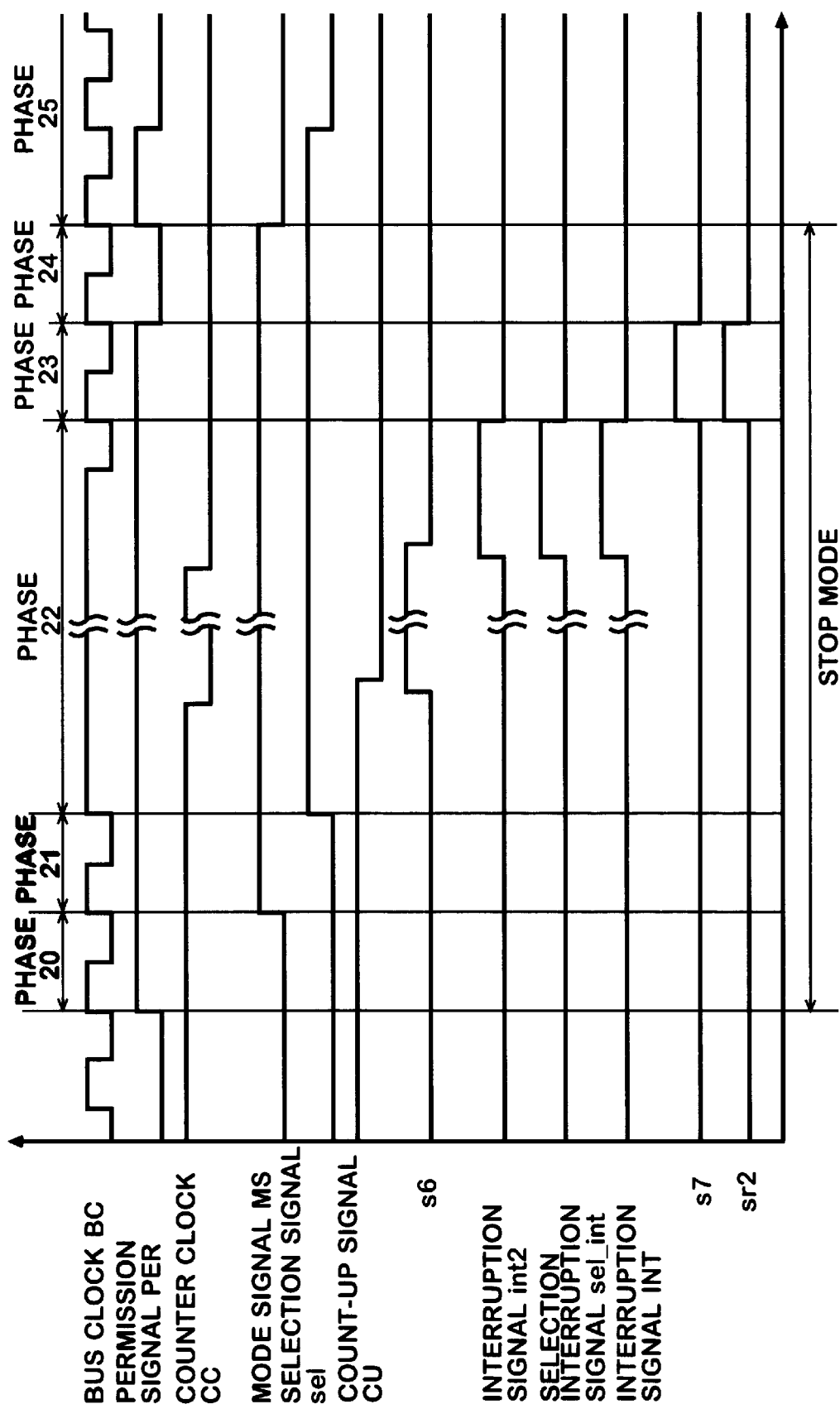
FIG. 4 is a time chart showing the operation of the interruption signal generating apparatus in a stop mode.

FIG. 4 is a time chart showing the operation of the interruption signal generating apparatus in the stop mode. The operation will now be described hereinbelow with reference to the time chart. In the stop mode, the mode signal MS is at the high level on the contrary to the case in the normal mode. The selector circuit 15, therefore, selects the interruption signal int2. On the other hand, since the mode signal MS is at the high level, the output of the interruption signal int1 is blocked by both the selector circuit 15 and the AND circuit 6.

Phase 20:

Prior to switching the mode signal MS, a high level signal is supplied as a permission signal PER to the AND circuit 16 synchronously with the bus clock BC.

Phase 21:

The mode signal MS is switched from the low level indicative of the normal mode to the high level showing the stop mode.

Phase 22:

When the mode signal MS is switched, the supply of the bus clock BC is stopped. After that, when the count-up signal CU is changed from the high level to the low level, that is, shows a trailing edge in order to show the count-up, the differentiating circuit 8 outputs a pulse corresponding to one cycle of the counter clock CC as a signal s6 in response to the trailing edge of the count-up signal CU.

Upon receipt of the high level of the signal s6 as the signal s6, the holding circuit 9 maintains a high level signal as an interruption signal int2. The interruption signal int2 is directly outputted as a selection interruption signal sel_int and an interruption signal INT. As mentioned above, the interruption signal INT is supplied from the interruption signal generating apparatus 100 to the interruption controller 500. Simultaneously with the supply, the interruption signal INT is also sent to the F/F circuit 14.

Phase 23:

Upon receipt of the interruption signal INT, the interruption controller 500 requests the system controller 300 to restart the supply of the bus clock BC. In response to this request, the system controller 300 restarts the supply of the bus clock BC. When the bus clock BC is supplied, the F/F circuit 14 outputs a high level signal as a signal s7 synchronously with the bus clock BC. The signal s7 generates a signal sr2 as it is. That is, in this instance, the signal sr2 is also set to the high level. Upon receipt of the high level signal sr2, the differentiating circuit 8 and holding circuit 9 are reset. Thus, the interruption signal int2 is set to the low level, so that the selection interruption signal sel_int and interruption signal INT are also set to the low level.

Phase 24:

The signal s7 is set to the low level synchronously with the bus clock BC, so that the signal sr2 is also set to the low level. Thus, the operations of the F/F circuits 2, 3, and 7, differentiating circuit 4, and holding circuit 5 can be restarted.

Phase 25:

When the mode signal MS is switched from the high level to the low level, that is, when the mode is returned from the stop mode to the normal mode, the permission signal PER is switched from a state of maintaining the high level to a state of periodically generating pulses. The selection signal sel is switched to the low level, thereby allowing the selector circuit 15 to select the interruption signal int1. After that, the operation in the normal mode described above is executed.

Prior to explaining the operation, the count-up signal CU is obtained by dividing in frequency the counter clock CC, more accurately, by dividing in frequency it into 1/hundreds, 1/thousands, 1/tens of thousand, . . . as described above. The pulse (shown at phase 22) of the interruption signal INT is generated after one cycle of the counter clock CC in response to the trailing edge (shown at phase 22) of the count-up signal CU; however, from the viewpoint of the frequency of the count-up signal CU, it is possible to regard that the pulse of the interruption signal INT shown at phase 22 is generated almost simultaneously with the trailing edge of the count-up signal CU shown at phase 22. Therefore, in both the normal mode and the stop mode, the pulse of the interruption signal INT shown at phase 16 of FIG. 3 and at phase 22 of FIG. 4 can be considered to arise almost simultaneously with the trailing edge of the count-up signal CU shown at phase 10 of FIG. 3 and at phase 22 of FIG. 4.

As mentioned above, according to the embodiment of the interruption signal generating apparatus, the interruption signal INT is generated in the normal mode. In addition, even in the stop mode in which no bus clock BC is supplied, the differentiating circuit 8 detects the trailing edge of the count-up signal CU indicative of the count-up, and the holding circuit 9 generates the interruption signal int2 serving for the interruption signal INT in response to detection of the trailing edge by the differentiating circuit 8. In the stop mode, therefore, the interruption signal INT can be outputted similar to in the normal mode.

Further, in the embodiment of the computer system, when the interruption signal INT is supplied, the interruption controller 500 requests the system controller 300 to restart the supply of the bus clock BC. In response to such a request, the system controller 300 supplies the bus clock BC again. Through the resupplying of the bus clock BC, the F/F circuit 14 in the interruption signal generating apparatus 100 can reset the interruption signal INT by using the signal sr2. That is, at an extremely early stage in the transition from the stop mode to the normal mode, the F/F circuit 14 can reset the interruption signal INT generated in the stop mode.

FIG. 5 is a time chart showing the operation for shifting from the stop mode to the normal mode. The operation will now be described hereinbelow with reference to the time chart.

Phase 30:

In the stop mode, a pulse of the interruption signal INT described with reference to FIG. 4 is generated after one cycle of the counter clock CC in response to a trailing edge E30 of the count-up signal CU. Since the frequency of the counter clock CC is much higher than that of the count-up signal CU, it can be regarded that a pulse P30 of the interruption signal INT is generated almost simultaneously with the trailing edge E30 of the count-up signal CU from the viewpoint of the frequency of the count-up signal CU.

Phase 31:

When the mode is switched from the stop mode to the normal mode, as described in FIG. 3 a pulse P31 of the interruption signal INT is generated after a few cycles of the bus clock BC in response to a trailing edge E31 of the count-up signal CU. That is, it can be regarded that the pulse P31 of the interruption signal INT is generated almost simultaneously with the generation of the trailing edge E31 of the count-up signal CU from the viewpoint of the frequency of the count-up signal CU From the viewpoint of both the timing at which the pulse P30 of the interruption signal INT in phase 30 is generated and the timing at which the pulse P31 thereof in phase 31 is generated, the time interval between the pulses P30 and P31 can be regarded as identical with the time interval between the trailing edge E30 of the count-up signal CU in phase 30 and the subsequent trailing edge E31 thereof in phase 31.

In conclusion, in the transition from the stop mode to the normal mode, the time interval between the last pulse of the interruption signal INT in the stop mode and the first pulse thereof in the normal mode can be regarded as identical with the time interval between the a trailing edge of the count-up signal CU and the subsequent trailing edge thereof in either the normal mode or the stop mode.

FIG. 6 is a time chart showing the shifting operation from the normal mode to the stop mode. The operation will now be described hereinbelow with reference to the time chart.

Phase 40:

In the normal mode, as described with reference to FIG. 3, a pulse P40 of the interruption signal INT is generated after a few cycles of the bus clock BC in response to a trailing edge E40 of the count-up signal CU.

Phase 41:

When the mode is switched from the normal mode to the stop mode, as described with reference to FIG. 4 a pulse P41 of the interruption signal INT is generated after one cycle of the counter clock CC in response to a trailing edge E41 of the count-up signal CU.

From the viewpoint of the both the timing at which the pulse P40 of the interruption signal INT in phase 40 is generated and the timing at which the pulse P41 thereof in phase 41 is generated, the time interval between the pulses P40 and P41 can be regarded as identical with the time interval between the trailing edge E40 of the count-up signal CU in phase 40 and the subsequent trailing edge E41 thereof in phase 41.

In conclusion, in the transition from the normal mode to the stop mode, the time interval between the last pulse of the interrupt signal INT in the normal mode and the first pulse thereof in the stop mode can be regarded as identical with the time interval between a trailing edge of the count-up signal CU and the subsequent trailing edge thereof in either the normal mode or the stop mode.

As mentioned above, the period or the time interval at which the pulses of the interruption signal INT are generated can be regarded to be identical with the period at which the trailing edges of the count-up signal CU are generated over the normal mode, the stop mode, the transition from the stop mode to the normal mode, and the transition from the normal mode to the stop mode. That is, according to the embodiment of the interruption signal generating apparatus, in addition to an advantage such that the interruption signal INT can be generated even in the stop mode, the interruption signal INT can be constantly generated at a predetermined period irrespective of modes and transitions of the computer system.

The present invention is not limited to the foregoing embodiment but many modifications and variations are possible within the spirit and scope of the appended claims of the invention.

What is claimed is:

1. An interruption signal generating apparatus used for a computer system that receives a first clock and a second clock from said computer system and outputs an interruption signal for requesting an execution of an interrupting process at a time interval corresponding to a frequency obtained by dividing in frequency said second clock, wherein said first clock is provided according to an operation mode of said computer system, and the second clock has a period longer than that of said first clock, is used to generate said interruption signal, and is provided irrespective of said operation mode of the computer system, the interruption signal generating apparatus comprising:
   a counter unit that counts said time interval based upon said second clock and outputs a count-up signal indicating an end of said counting;
   a first generating unit that detects said end of said counting indicated by said count-up signal while said first clock is being provided and generates a first interruption signal indicating said detection according to said first clock;
   a second generating unit that detects said end of said counting indicated by said count-up signal while said first clock is not being provided and generates a second interruption signal indicating said detection according to said second clock; and
   a selecting unit that selectively outputs said first interruption signal and said second interruption signal according to said operation mode of said computer system.

2. An apparatus according to claim 1, wherein said first clock is a bus clock signal for synchronizing the operation of said computer system as a whole.

3. An apparatus according to claim 1, wherein
   said count-up signal indicates said end of said counting by a change in edge of said count-up signal,
   said first generating unit has a first differentiating circuit that detects said edge, and
   said second generating unit has a second differentiating circuit that detects said edge.

4. An apparatus according to claim 3, wherein
   said first and second generating units are supplied with a permission signal for permitting an output of said first and second interruption signals by said computer system,
   said first generating unit further has a first holding circuit that holds a first detection signal indicative of the detection of said edge in response to the detection of said edge by said first differentiating circuit,
   said second generating unit further has a second holding circuit that holds a second detection signal indicative of the detection of said edge in response to the detection of said edge by said second differentiating circuit,
   said first generating unit generates said first interruption signal in accordance with said first clock, said first detection signal, and said permission signal, and
   said second generating unit generates said second interruption signal in accordance with said second clock, said second detection signal, and said permission signal.

5. An apparatus according to claim 1, wherein
   said computer system restarts the supply of said first clock to said first generating unit of said interruption signal generating apparatus in response to said second interruption signal which is outputted from said selecting unit, and
   said second generating unit has a reset circuit that resets said second interruption signal in response to said restart of said supply of said first clock.

6. An apparatus according to claim 1, wherein
   said signal selected by said selecting unit is outputted at substantially the same time with said output of said count-up signal indicative of said end of said counting of said time interval.

7. An apparatus according to claim 6, wherein
   a time interval between adjacent ones of a plurality of first interruption signals during a period in which said first clock is provided, a time interval between adjacent ones of a plurality of second interruption signals during a period in which said first clock is not provided, a time interval between a last one of a plurality of first interruption signals during the period in which said first clock is provided and a first one of said plurality of second interruption signals during the period in which said first clock is not provided following the period in which said first clock is provided, and a time interval between a last one of a plurality of second interruption signals during the period in which said first clock is not provided and a first one of a plurality of first interruption signals during a the period in which said first clock is provided following the period in which said first clock is not provided, are substantially identical to each other.

8. A computer system comprising:
   an interruption signal generating apparatus that receives a first clock and a second clock and outputs an interruption signal for requesting an execution of an interrupting process at a time interval corresponding to a frequency obtained by dividing in frequency the second clock, wherein the first clock is provided according to an operation mode of the computer system, and the second clock has a period longer than that of the first clock, is used to generate the interruption signal, and is provided irrespective of the operation mode of the computer system, the interruption signal generating apparatus including:
      a counter unit that counts the time interval based upon the second clock and outputs a count-up signal indicating an end of the counting,
      a first generating unit that detects the end of the counting indicated by the count-up signal while the first clock is being provided and generates a first interruption signal indicating the detection according to the first clock,
      a second generating unit that detects the end of the counting indicated by the count-up signal while the first clock is not being provided and generates a second interruption signal indicating the detection according to the second clock, and
      a selecting unit that selectively outputs the first interruption signal and the second interruption signal according to the operation mode of the computer system;
   a central processing unit that stops the supply of the first clock in accordance with a predetermined program while the first clock is being supplied; and
   a system controller that starts the supply of the first clock in response to the interruption signal from said interruption signal generating apparatus while the first clock is not provided.

* * * * *